United States Patent [19]
Eldred

[11] 3,754,624
[45] Aug. 28, 1973

[54] FLEXIBLE KEY FOR DISC BRAKE

[75] Inventor: Wendell E. Eldred, South Bend, Ind.

[73] Assignee: The Bendix Corporation, South Bend, Ind.

[22] Filed: Sept. 17, 1971

[21] Appl. No.: 181,396

[52] U.S. Cl. .................. 188/71.5, 64/27 L, 74/443, 188/71.1, 188/73.5, 188/264 G, 192/106.1, 287/53 SS
[51] Int. Cl. ............................................ F16d 55/36
[58] Field of Search ................ 188/71.1, 71.5, 73.5, 188/218 A, 264 G; 192/70.17, 2, 106.1; 287/53 SS; 74/443, 14; 64/27 L

[56] References Cited
UNITED STATES PATENTS

| | | | |
|---|---|---|---|
| 1,415,841 | 5/1922 | Seitz | 192/70.2 |
| 2,737,033 | 3/1956 | Bendall | 64/14 |
| 2,925,889 | 2/1960 | Albright | 188/71.5 X |
| 3,191,735 | 6/1965 | Wavak | 192/70.2 X |
| 3,438,464 | 4/1969 | Barrington | 188/71.5 |

Primary Examiner—George E. A. Halvosa
Attorney—Gordon H. Chenez et al.

[57] ABSTRACT

A disc brake having a plurality of force transmitting flexible key members interposed in circumferentially spaced-apart relationship between a wheel and rotor disc and/or stator disc and fixed support wherein the key members are adapted to flex under force load to thereby distribute the force load substantially equally between the plurality of key members.

6 Claims, 7 Drawing Figures

Patented Aug. 28, 1973

INVENTOR.
WENDELL E. ELDRED

BY

*Gordon H. Cheney*

AGENT

3,754,624

FLEXIBLE KEY FOR DISC BRAKE

BACKGROUND OF THE INVENTION

Conventional multiple disc brakes of the high capacity type such as aircraft brakes include rotor and stator discs having a plurality of circumferentially spaced-apart key slots adapted to engage associated keys secured to a wheel in the case of the rotor disc and to a fixed torque tube in the case of the stator disc. Due to manufacturing tolerance variations in the circumferential spacing and width of the keys as well as the key slots, the rigid keys may not be engaged simultaneously by the rotor or stator disc resulting in the entire torque load being imposed on the keys that are engaged by the rotor or stator disc and thus creating undesirable high stress in the rotor or stator particularly in the region of the associated slots. Such high stress may be very critical particularly in the case of rotors and/or stators formed of brittle material such as carbon, beryllium, ceramics and the like of high heat capacity and resistance to deterioration from high temperature which are being proposed for use as a substitute for conventional metal such as steel, etc., rotor and/or stator discs.

Various other disadvantages of conventional rigid key constructions particularly in aircraft brakes include the weight penalty attributed to solid key members and manufacturing costs caused by accurate machining requirements to adapt the wheel for such solid key members and undesirable high heat transfer characteristics of solid key members which tend to promote undesired heat transfer from the relatively hot brake section (rotors, stators, etc.) to the wheel including tire mounted thereon.

SUMMARY OF THE INVENTION

The present invention relates to flexible force transmitting sheet metal key members interconnecting a rotatable wheel and disc brake rotor and/or a disc brake stator and torque absorbing fixed support. The flexible key members may be independently mounted in circumferentially spaced-apart relationship between the wheel or support and associated rotor or stator. The flexible key members may also take the form of a continuous corrugated or serpentine strip of metal interposed between and engageable with the wheel or support and associated rotor or stator. The flexible key members are adapted to flex in response to applied rotor or stator torque thereby insuring engagement of all the key members against the rotor or stator and distributing the applied torque substantially equally between the key members. The independently mounted key members may be slotted longitudinally to provide the same with dual spring rate effect. Advantages of the present flexible key members over conventional solid bar type keys include less cross sectional area and corresponding less heat transfer therethrough, lighter weight, better thermal expansion characteristics and less expensive to manufacture.

It is an object of the present invention to provide flexible force transmitting key structure particularly adapted for multiple key installations wherein it is desirable to distribute applied force equally between the plurality of keys.

It is another object of the present invention to provide a flexible force transmitting key structure particularly adapted for use in multiple disc brakes wherein the rotor and/or stator discs thereof are formed of carbon or similar material.

It is an important object of the present invention to provide force transmitting key structure easily and quickly formed of relatively inexpensive sheet metal.

It is another object of the present invention to provide relatively lightweight flexible force transmitting key structure for aircraft multiple disc brakes wherein each disc is adapted to engage a plurality of circumferentially spaced-apart force transmitting key members.

DESCRIPTION OF THE PREFERRED EMBODIMENTS

Figure 1:
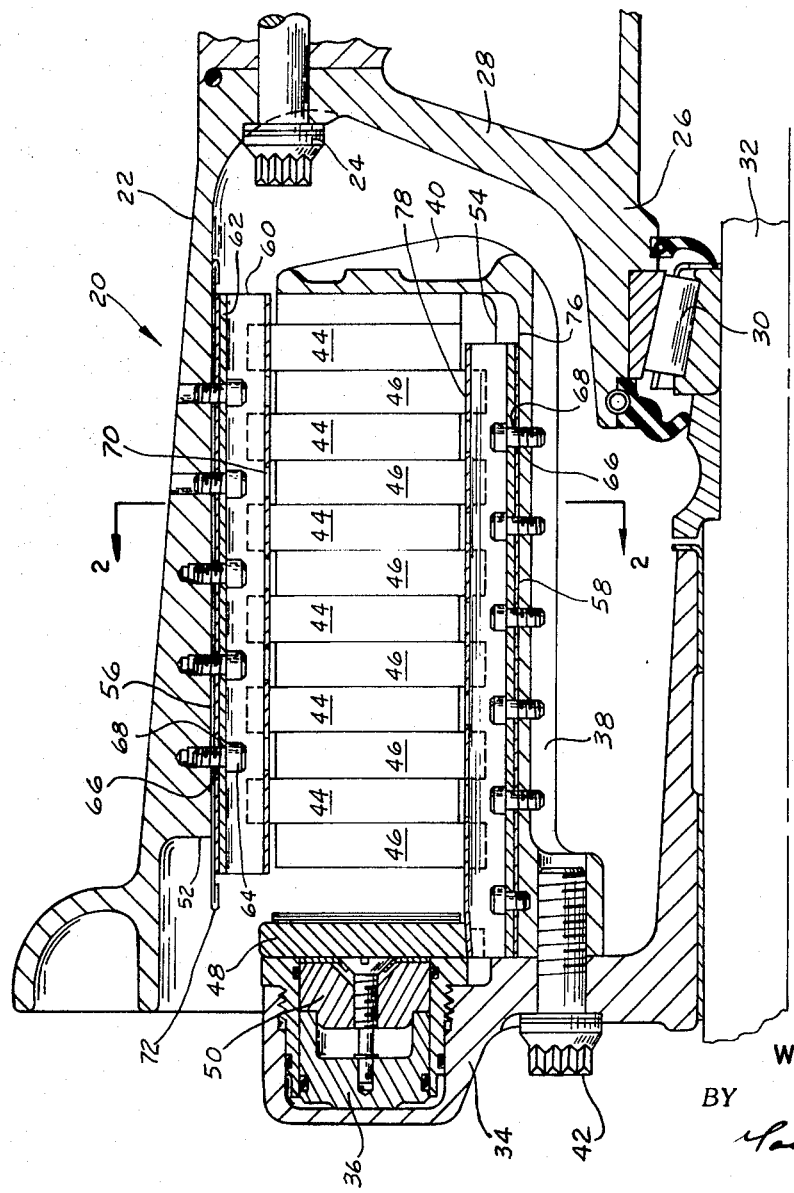
FIG. 1 represents a sectional view of a conventional aircraft multiple disc brake embodying the present invention.
Figure 3:
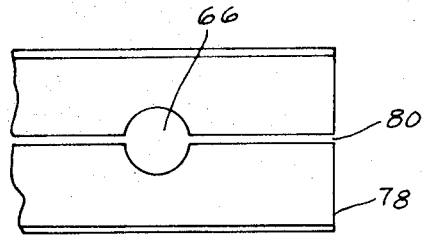
FIG. 3 represents a section view taken on line 3—3 of FIG. 2.
Figure 4:
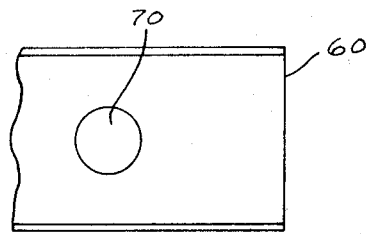
FIG. 4 represents a view similar to FIG. 3 showing a modified form of the key member wherein a longitudinal slot therein is provided.

Referring to FIG. 1, in particular, numeral 20 designates a conventional aircraft wheel having a tire engaging rim portion 22 only half of which is shown. A plurality of tie bolts 24 fixedly secures the two halves together. A hub portion 26 is attached to rim portion 22 via integral spoke or strut members 28. The wheel 20 is rotatably mounted via suitable bearing means 30 on a non-rotatable axle 32 forming part of a conventional aircraft landing gear, not shown. A fixed annular carrier member 34 suitably mounted on axle 32 is provided with a plurality of circumferentially spaced-apart pistons 36 slidably carried therein and hydraulically connected to a source of pressurized fluid, not shown, under control of the aircraft pilot. An annular torque absorbing tube member 38 having an integral radially extending backing plate 40 is fixedly secured to carrier member 34 by a plurality of circumferentially spaced-apart bolts 42 only one of which is shown.

A plurality of axially spaced-apart annular rotor members 44 are keyed to rim portion 22 and rotatable therewith. A plurality of axially spaced-apart annular stator members 46 interleaved with rotor members 44 are keyed to torque tube member 38 and fixed rotationally thereby. An annular pressure plate 48 suitably secured to pistons 36 and keyed to torque tube member 38 is actuated in response to pressurization of pistons 36 into engagement with outermost stator member 46 to thereby urge the plurality of rotor members 44 and stator members 46 or "stack" axially. The opposite outermost rotor member 44 bears against backing plate 40 causing the "stack" of rotor and stator members 44 and 46 to be compressed and frictionally engaged accordingly to the extent of the axially directed force derived from pistons 36.

A block of suitable heat insulating material 50 suitably secured to piston 36 and separating pistons 36 from pressure plate 48 serves to minimize heat transfer therebetween.

Figure 2:
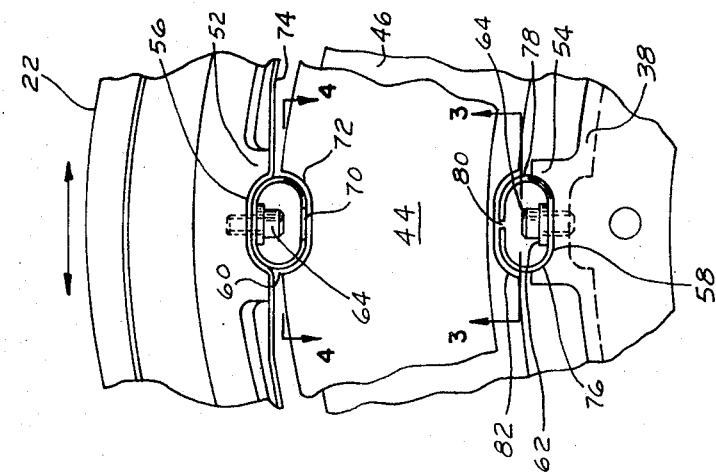
FIG. 2 represents a section view taken along line 2—2 of FIG. 1.

The present invention is directed to the structure by means of which the rotor members 44 are keyed to the rim portion 22 and stator members 46 are keyed to torque tube member 38. To that end, referring to FIGS. 1, 2, 3 and 4, the rim portion 22 and torque tube member 38 are provided with circumferentially spaced-apart axially extending ribs or chines 52 and 54, respectively, and associated axially extending grooves or recesses 56 and 58 therein. Each groove or recess 56 is adapted to receive a mating elongated tubular flexible key member 60 formed from suitable sheet metal and, in the embodiment of FIG. 2, having a generally oval or "race track" cross section. The flexible key member 60 may be fabricated from stainless steel or other suitable metal or any suitable material having the required elastic, strength and heat resistant characteristics. A metal backing strip 62 bears against the inner wall of key member 60. A plurality of spaced-apart fastening members such as screws 64 which extend through suitable openings 66 and 68 in key member 60 and strip 62, respectively, into threaded engagement with rim portion 22 serve to fixedly secure key member 60 in position in groove 56. Access openings 70 in key member 60 are aligned with openings 66 to provide for insertion of screws 64 as well as a suitable tool, not shown, for rotating the screws 64.

The rotor members 44 are slidably engaged with key members 60 for axial movement relative thereto. To that end, the outermost portions of rotor members 44 are provided with spaced-apart, axially extending grooves or recesses 72 adapted to mate with the key members 60 to thereby rotatably couple the rim portion 22 and rotor members 44 as well as permit relative axial movement therebetween.

A conventional annular heat plate or shield 74 may be interposed between key members 60 and rim portion 22 to minimize heat transfer radially outwardly from the rotors 44 and stators 46 to the tire, not shown, carried by rim portion 22.

The ribs or chines 54 on torque tube member 38 are provided with grooves or recesses 76 adapted to receive mating flexible key members 78 similar to key member 60 but which are each provided with a longitudinally extending slot 80 in the portion thereof extending outwardly from recess 76 and adapted to be received by an associated mating groove or recess 82 in the radially innermost portion of stator member 46. The stator members 46 are thus slidably engaged for axial movement on key members 78 which also rotatably couple the torque tube member 38 and stator members 46. Each key member 78, like key member 60, is provided with a metal backing strip 62 as well as spaced-apart fastening screws 64 which screws extend through openings 66 and 68 in key member 78 and backing strip 62, respectively, into threaded engagement with the torque tube member 38. The key members 78, like key members 60, are provided with spaced-apart access openings 70.

Figure 5:
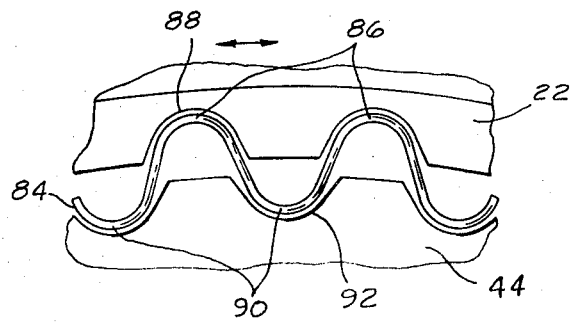
FIG. 5 represents another embodiment of the present invention.

Referring to FIG. 5, the embodiment shown therein includes an annular band of sheet metal 84 having a serpentine or corrugated cross section wherein the radially outwardly extending curve or key portions 86 thereof engage mating axially extending circumferentially spaced-apart grooves or recesses 88 in rim portion 22 and wherein the radially inwardly extending curved or key portions 90 thereof engage mating circumferentially spaced-apart grooves or recesses 92 in rotor members 44. It will be understood that the serpentine shape of band 84 may take various forms other than sinusoidal as, for example, by flattening alternate curved portions to reduce the number of curved key portions 86 or 90 engageable with rim portion 22 or rotor members 44. A significant advantage of the annular band 84 is that it may serve as a heat shield in addition to key means thereby eliminating the necessity of providing a separate heat shield as in the case of shield 74 in FIG. 1.

Figure 6:
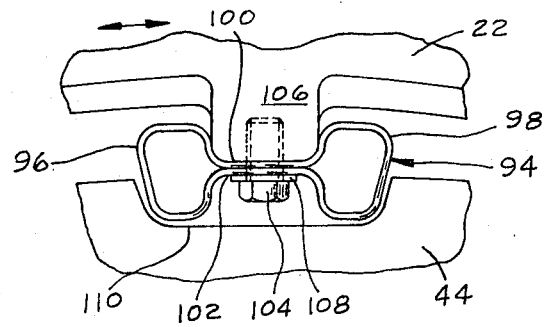
FIG. 6 represents another embodiment of the present invention.

Referring to FIG. 6, the embodiment shown therein includes a plurality of axially extending circumferentially spaced-apart sheet metal key members 94 only one of which is shown. Each key member 94 is defined by spaced-apart sheet metal tubular sections 96 and 98 joined by integral flat wall portions 100 and 102 which, in cross section, may be termed "dumbell shaped." The wall portions 100 and 102 are suitably apertured to provide a plurality of axially spaced-apart openings through which fastening means such as screws 104 extend into threaded engagement with a rib or chine 106 formed on rim portion 22 to thereby secure key member 94 in position thereon. A backing strip 108 having suitable openings to receive screws 104 may be provided to securely clamp wall portions 100 and 102 against rib or chine 106. As shown in FIG. 6, the width of rib or chine 106 is somewhat greater than the width of flat wall portions 100 and 102 and the edges thereof curved to mate with the adjacent curved walls of tubular sections 96 and 98 thereby providing a seat for a portion of tubular sections 96 and 98. The lower portions, i.e., the curved portions depending from wall portion 102, of tubular sections 96 and 98 extend into an axially extending groove or recess 110 in the radially outermost portion of rotor member 44 to thereby rotatably couple rim portion 22 and rotor member 44.

Figure 7:
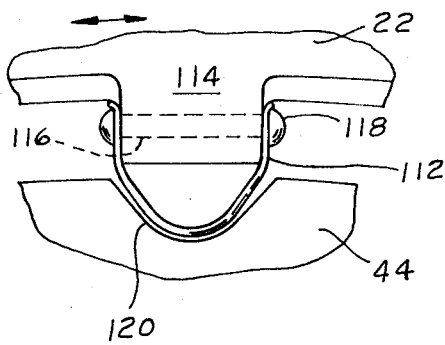
FIG. 7 represents another embodiment of the present invention.

Referring to FIG. 7, the embodiment shown therein includes a plurality of circumferentially spaced-apart generally U-shaped axially extending sheet metal key members 112 only one of which is shown. The side portions of each key member 112 are held in spaced-apart relationship by an axially extending rib or chine 114. Each rib or chine 114 is provided with a plurality of axially spaced-apart openings 116 which are aligned with corresponding openings in the side walls of key member 112 to receive fastening means such as rivets 118 which fixedly secure key member 112 in position on rib or chine 114. The base portion of key member 112 extends into mating grooves or recesses 120 formed in the radially outermost portion of rotor members 44 to thereby rotatably couple rim portion 22 and rotor members 44.

Referring to FIG. 1, pressurized fluid is applied to pistons 36 to effect frictional engagement of the rotors 44 and stators 46 between pressure plate 48 and backing plate 40. The resulting force tending to retard rotation of rim portion 22 is transmitted through the rotor key members 60 as well as stator key members 78.

Assuming that a rotor member or members 44 engages one or possibly two or three of the key members 60, it will be recognized that the retarding force or torque applied to rim portion 22 will be borne solely by the engaged keys thereby tending to create undesirable high localized force loading on rotor member 44 as well as the rim portion 22 both of which bear against the keys. Since rotor members 44 are preferably formed of carbon or similar relatively weak material, the ability of the same to withstand high stress particularly in the tension or shear modes is limited accordingly thereby making the rotor members 44 vulnerable to structural failure should the force load be unequally divided to a significant extent as would occur in the case of prior art unyielding key members. However, in the case of flexible key members 60, the above-mentioned relatively few key members subjected to the entire force load will tend to deform depending upon the spring rate thereof in the direction of the force applied thereagainst by rotor member 44. The deformation of the key members 60 allows the rotor member 44 to rotate relative to rim portion 22 to the extent that one or more of the remaining key members 60 are engaged by rotor member 44 which, in turn, reduces the portion of the total force load imposed on any given previously engaged key member 60. It will be noted that a progressive increase in force load tending to retard rotation of rim portion 22 ultimately results in progressive engagement of any given rotor member 44 will all of the key members 60 engageable therewithin as a result of the above-mentioned flexible characteristic of key members 60.

The stator members 46 are preferably formed of carbon or the like material and, like rotor members 44, are vulnerable to structural failure in the event of localized high stress particularly in the region of the grooves or recesses 82. The key members 78 engaged by stator members 46 function in the same manner as key members 60 heretofore described with the exception that key members 78 have a dual spring rate by virtue of the slot 80 formed therein.

Depending upon the direction of rotation of the rotor members 44 frictionally engaged with a stator member 46, the stator member 46 will be forced into engagement with the curved portion of key member 78 at one side of slot 80. The engaged curved portion bends with a characteristic spring rate under the influence of the applied force until it engages the adjacent curved portion of key member 78 whereupon both of the curved portions with their respective spring rates are effective in opposing the applied force of stator member 46. Thus, the key members 78 are capable of bending or deforming to provide equalized load distribution thereof under a normal range of brake torque and subsequently become more resistant as the brake torque increases to a maximum.

The serpentine band 84 of FIG. 5 functions in the same manner as the flexible keys 60 of FIG. 1 in that any given one or more curved portion 86 thereof when engaged by rotor member 44 tends to bend thereby permitting corresponding relative movement between rim portion 22 and rotor member 44 until all of the curved portions 86 become positively engaged with rotor member 44. An advantage of the serpentine band 84 is that it requires no fastening members such as screws 64 of FIG. 1 thereby eliminating the necessity of threaded openings in rim portion 22 which openings have a tendency to produce stress concentration in the rim 22 in the region of the openings. It will be understood that the serpentine band 84 may be made in two or more arcuate segments arranged end to end or suitably spaced-apart rather than the continuous band shown.

The embodiments shown in FIGS. 6 and 7 are, like those described above, adapted to deform or bend transversely under load imposed there-against by rotor member 44 to thereby permit engagement of all of the key members and substantially equal distribution of the brake torque load therebetween. The embodiment of FIG. 7 has the advantage of being simply and easily formed and attached by fastening means which, by virtue of their transverse relationship to the keys 112, may have a more desirable load bearing capacity and thus may be of smaller size.

I claim:

1. Flexible force transmitting key apparatus particularly adapted for use in a disc brake having a plurality of frictionally engageable annular members, at least one of which is rotatably driven by a wheel member and another of which is rotatably fixed to a fixed support member, said key apparatus comprising:
   a plurality of circumferentially spaced apart resilient key members each defined by a tubular metal member extending perpendicular to said annular members and interposed between one of said wheel and fixed support members and its associated annular member for providing the sole resistance to relative rotational movement therebetween;
   fastening means fixedly securing said tubular metal member to said one of said wheel and fixed support members; and
   a recess formed in said annular member and adapted to receive said tubular metal member;
   said plurality of resilient key members each being independently engageable with said one of said wheel and fixed support members and associated annular member and adapted to deform under force load to an extent permitting engagement of all of said resilient key members with both of said one of said wheel and fixed support members and said associated annular member.

2. Flexible force transmitting key apparatus as claimed in claim 1 wherein:
   said fastening means includes a backing member bearing against a portion of said tubular metal member and screw means extending through said backing member and said tubular metal member into threaded engagement with said one of said wheel and fixed support members.

3. Flexible force transmitting key apparatus as claimed in claim 1 wherein:
   said tubular metal member is defined by spaced apart parallel tubular metal portions joined by wall means integral therewith;
   said one of said wheel and fixed support members is provided with an axially extending support member;
   said fastening means fixedly securing said wall means to said support member;
   said recess formed in said annular member adapted to receive said spaced apart tubular metal portions.

4. Flexible force transmitting key apparatus as claimed in claim 1 wherein:
   said plurality of resilient key members are fixedly secured to said wheel member; and
   arcuate heat shield means interposed between said plurality of resilient key members and said wheel acts to minimize heat transfer from said annular members to said wheel.

5. Flexible force transmitting key apparatus as claimed in claim 1 wherein:

said tubular metal member is provided with a longitudinal slot defining spaced apart first and second flexible wall portions of said tubular member.

6. Flexible force transmitting key apparatus as claimed in claim 5 wherein:

said first wall portion is engaged by said annular member and urged into engagement with said second wall portion to cause an increase in the effective spring rate of said tubular member.

* * * * *